United States Patent [19]

Zittel et al.

[11] Patent Number: 4,942,810

[45] Date of Patent: Jul. 24, 1990

[54] WATER SEAL BLANCHER

[75] Inventors: David R. Zittel; Gregory M. Robbins, both of Columbus, Wis.

[73] Assignee: Lyco Manufacturing, Inc., Columbus, Wis.

[21] Appl. No.: 245,203

[22] Filed: Sep. 15, 1988

[51] Int. Cl.⁵ .................... A23L 3/00; A23N 12/00
[52] U.S. Cl. .................... 99/477; 99/404; 99/443 C; 99/483; 99/516
[58] Field of Search ............. 99/443 R, 443 C, 467, 99/417, 468, 403, 470, 404, 473–475, 477, 427, 478, 483, 485, 487, 516, 534, 536; 426/510, 511, 520, 521, 524; 312/1

[56] References Cited

U.S. PATENT DOCUMENTS

| 887,628 | 5/1908 | Hall | 99/477 |
|---|---|---|---|
| 2,556,385 | 6/1951 | Allan . | |
| 2,781,070 | 2/1957 | Kilburn et al. . | |
| 3,316,829 | 5/1967 | Foldenauer . | |
| 3,352,338 | 11/1967 | Hirahara et al. . | |
| 3,491,679 | 1/1970 | Kelly | 99/477 |
| 3,498,208 | 3/1970 | Longe et al. . | |
| 3,501,213 | 3/1970 | Trexler . | |
| 3,736,860 | 6/1973 | Vischer, Jr. | 99/443 C |
| 3,778,521 | 12/1973 | Fisher et al. | 99/516 |
| 3,880,068 | 4/1975 | Goodale | 99/478 |
| 3,910,175 | 10/1975 | Smith | 99/474 |
| 3,982,481 | 9/1976 | Console et al. | 99/477 |
| 3,993,788 | 11/1976 | Longenecker | 99/443 C |
| 4,092,911 | 6/1978 | Goodale | 99/478 |
| 4,121,509 | 10/1978 | Baker et al. | 99/443 C |
| 4,387,630 | 6/1983 | Timbers et al. | 99/516 |
| 4,604,948 | 8/1986 | Goldhahn | 99/483 |
| 4,688,476 | 8/1987 | Zittel | 99/403 |
| 4,702,161 | 10/1987 | Andersen | 99/477 |
| 4,796,523 | 1/1989 | Mette | 99/477 |

OTHER PUBLICATIONS

The Key Technology, Inc. Hydro Food Pump advertisement.
The Lyco Manufacturing, Inc. Stationary Screen advertisement.

Primary Examiner—Timothy F. Simone
Attorney, Agent, or Firm—Lathrop & Clark

[57] ABSTRACT

An improved water seal blancher which utilizes a substantially steam proof chamber to subject a particulate food product to a continuous, controlled temperature treatment in steam, and which utilizes a minimum of moving mechanical parts to transport the food product into and out of the steam chamber, includes a base which is adapted to contain a conveyor apparatus for conveying food product through the steam, a cover which effectively closes the tank to form a steam-tight chamber, a feed tank intake at the feed end for receiving the food product into entraining water, and a pump which pumps the water and entrained food product into the steam chamber to a dewaterer which both separates the food product from the water, and forms a water seal which prevents steam within the steam chamber from escaping through the dewaterer and pump. The water separated by the dewaterer within the steam chamber is returned to the intake in such a manner that a water seal is maintained which prevents steam within the chamber from escaping through the return conduit to the exterior of the blancher. A similar system may be utilized at the discharge end for removing the steam particulate food product from the blancher.

23 Claims, 4 Drawing Sheets

WATER SEAL BLANCHER

BACKGROUND OF THE INVENTION

1. Field of the Invention

The present invention relates to industrial food processing machines which are used for blanching food products with steam, and the means by which a seal is maintained to prevent the steam within the blancher from escaping. More specifically, the present invention relates to food blanchers in which water is utilized to maintain water seals which keep the steam from leaking from the blancher.

2. Description of the Prior Art

In the process of blanching food products such as particulate vegetables, one of the major expenses is the energy cost involved in generating the steam which is used within the blancher to heat the vegetables. This is a particularly significant problem because the food product somehow has to be moved from the exterior of the blancher into the blancher steam chamber to be steamed, and then moved again to the exterior of the blancher for further processing. Several different types of methods have been utilized to minimize the amount of steam which escapes from the blancher, thereby reducing the energy cost involved in steam production. In U.S. Pat. No. 4,092,911 to Goodale, valves having rotating paddles with peripheral sealing members on the paddles are utilized to drop particulate food product into and out of the steam chamber while the motor-driven paddles and peripheral sealing members maintain a seal between the steam chamber and the exterior of the blancher. A multiple tank blancher with a steam chamber formed by a hood having a lower margin which is submerged in two water tanks and troughs therebetween is disclosed in U.S. Pat. No. 3,880,068 to Goodale. The blancher also includes multiple conveyor apparatuses to move the food product through the tanks and steam chamber.

Blanchers with partially water-filled troughs which are positioned so that the lower margin of the entire cover rests within the troughs to form a water seal also have been utilized. In this type of blancher, the water seal prevents the escape of steam between the cover and the tank or base. Accordingly, while water-filled troughs do an acceptable job of maintaining a water seal around the periphery of the tank, efficient movement of food products from the ambient atmosphere into the steam atmosphere within the blancher chamber and out again, in a simple, efficient manner with a minimum of moving mechanical parts and without significant loss of steam, remains a problem. Steam blanchers typically have had a large number of moving mechanical parts which are utilized in moving the food product into and out from the steam chamber through sealed or partially sealed areas. These multiple moving parts, which must operate in both air and water environments are subject to fouling and corrosion, wear and breakdown.

SUMMARY OF THE INVENTION

The present invention is summarized in that an improved water seal blancher which utilizes a substantially steam tight chamber to subject a particulate food product to a continuous, controlled temperature treatment in steam, and which utilizes a minimum of moving mechanical parts in transporting the particulate food product into and out of the blancher, includes an elongated open top base with a feed end and a discharge end, the base including a substantially closed base bottom wall which at the feed end thereof defines a feed orifice through which food product enters the blancher entrained in first entraining water and a return orifice through which separated first entraining water returns to an exterior of the blancher, and an elongated cover which together with the base defines the steam chamber, the chamber being adapted to contain a conveyor apparatus for transporting food product through the steam from the feed end to the discharge end of the chamber. The improved water seal blancher furthermore includes means at the feed end for receiving the food product, for entraining the food product in the first entraining water, and for conducting the entrained food product into the blancher in sealed relation through the feed orifice; and a first riser tank which includes a bottom defining a bottom hole connected to the receiving, entraining and conducting means to receive the water and entrained food product into the tank. The riser tank furthermore includes upwardly extending walls joined together and to the bottom such that the first entraining water which fills the riser tank forms with the upwardly extending walls a tank water seal. One of the upwardly extending walls includes a substantially horizontal upper edge which is lower than upper edges of other upwardly extending walls so that the entraining water and food product can spill out of the tank over the horizontal upper edge. The improved water seal blancher furthermore includes a slanted screen below the horizontal upper edge positioned to receive the entraining water and entrained food product such that the first entraining water falls through the screen, and the food product is separated from the water to slide down the topside of the slanted screen to the conveying apparatus; and means for conducting the separated first entraining water through the return orifice and back to the receiving, entraining and conducting means such that a water seal is maintained between the chamber atmosphere and an external atmosphere.

The improved water seal blancher furthermore may include means at the discharge end for receiving the food product discharged from the conveyor apparatus, for entraining the food product in the second entraining water, and for conducting the food product out from the chamber in sealed relation through the discharge orifice, and a second riser tank including a bottom defining a bottom hole connected to the receiving, entraining and conducting means to receive the water and the entrained food product into the tank. The second riser tank furthermore includes upwardly extending walls joined together and to the bottom such that the second entraining water can fill the riser tank and form with the upwardly extending walls a tank water seal. One of the upwardly extending walls includes a substantially horizontal upper edge which is lower than upper edges of the other upwardly extending walls so that the entraining water and food products spill out of the tank over the horizontal upper edge. The blancher furthermore may include a slanted screen below the horizontal upper edge of the second riser tank positioned to receive the water and entrained food product such that the second entraining water can fall through the screen and the food product is separated from the water to slide down the top side of the slanted screen.

A primary object of the invention is to provide an improved water seal steam blancher which utilizes a minimum of moving mechanical parts for moving particulate food product into and out of the steam chamber.

A second object of the invention is to provide an improved water seal blancher which entrains the particulate food product in water and pumps that water and entrained food product into the steam chamber.

An additional object of the invention is to provide an improved water seal blancher which includes a dewaterer within the steam chamber which has no moving parts and which removes the particulate food product from the water in which the food product was entrained and pumped into the steam chamber.

A further object of the invention is to provide an improved water seal blancher in which the separated entraining water is removed from the dewaterer within the steam chamber to the exterior of the steam chamber without allowing any of the uncondensed steam to escape through the return conduit to the exterior.

Another object of the invention is to provide an improved water seal blancher in which a dewaterer within the steam chamber provides a water seal against the escape of steam from the steam chamber to the exterior of the chamber.

Yet an additional object of the invention is to provide an improved water seal blancher in which the particulate food product being discharged from the blancher is entrained within entraining water which provides a water seal preventing the escape of steam from the steam chamber, and then is withdrawn with the water to the exterior of the blancher where eventually the particulate food product is dewatered.

Yet a further object of the invention is to provide an improved water seal blancher in which the particulate food product being discharged is entrained within cooled water which is then pumped to the exterior of the blancher where the particulate food product is dewatered and the separated entraining water is chilled and then returned to the location where the particulate food product entraining occurs.

Yet another object of the invention is to provide an improved water seal blancher in which the particulate food product may be pumped into and withdrawn from the steam chamber by utilizing one or more pumps as the only substantial moving mechanical apparatus.

Other objects, features and advantages of the invention will be apparent from the following detailed description taken in conjunction with the accompanying drawings wherein a preferred embodiment of the invention has been selected for exemplification.

DESCRIPTION OF THE PREFERRED EMBODIMENT

Figure 1:
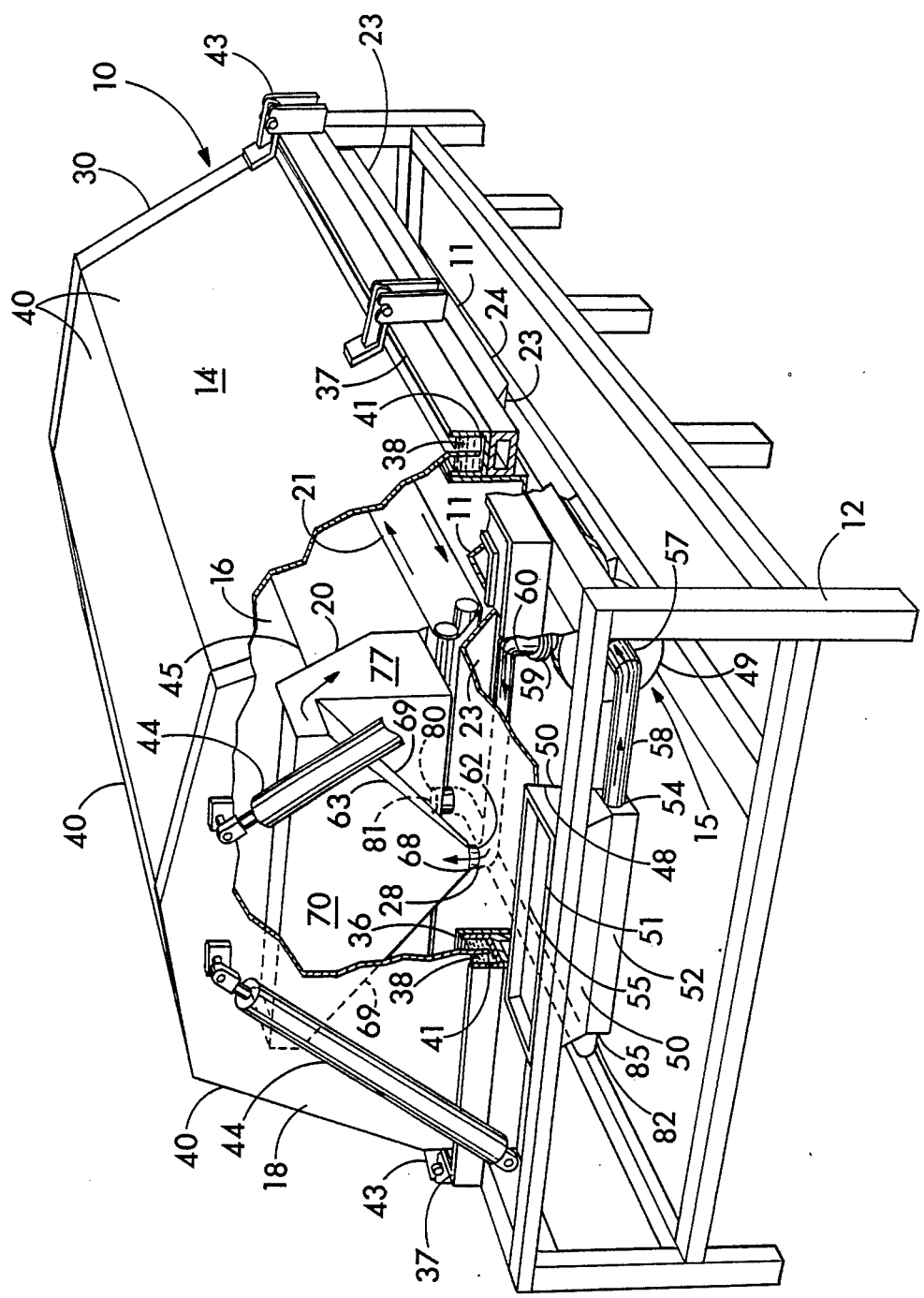
FIG. 1 is a perspective view of the improved water seal blancher of the present invention, showing a portion of the cover and base cut away to expose the steam chamber, dewaterer, and conveyor apparatus.
Figure 2:
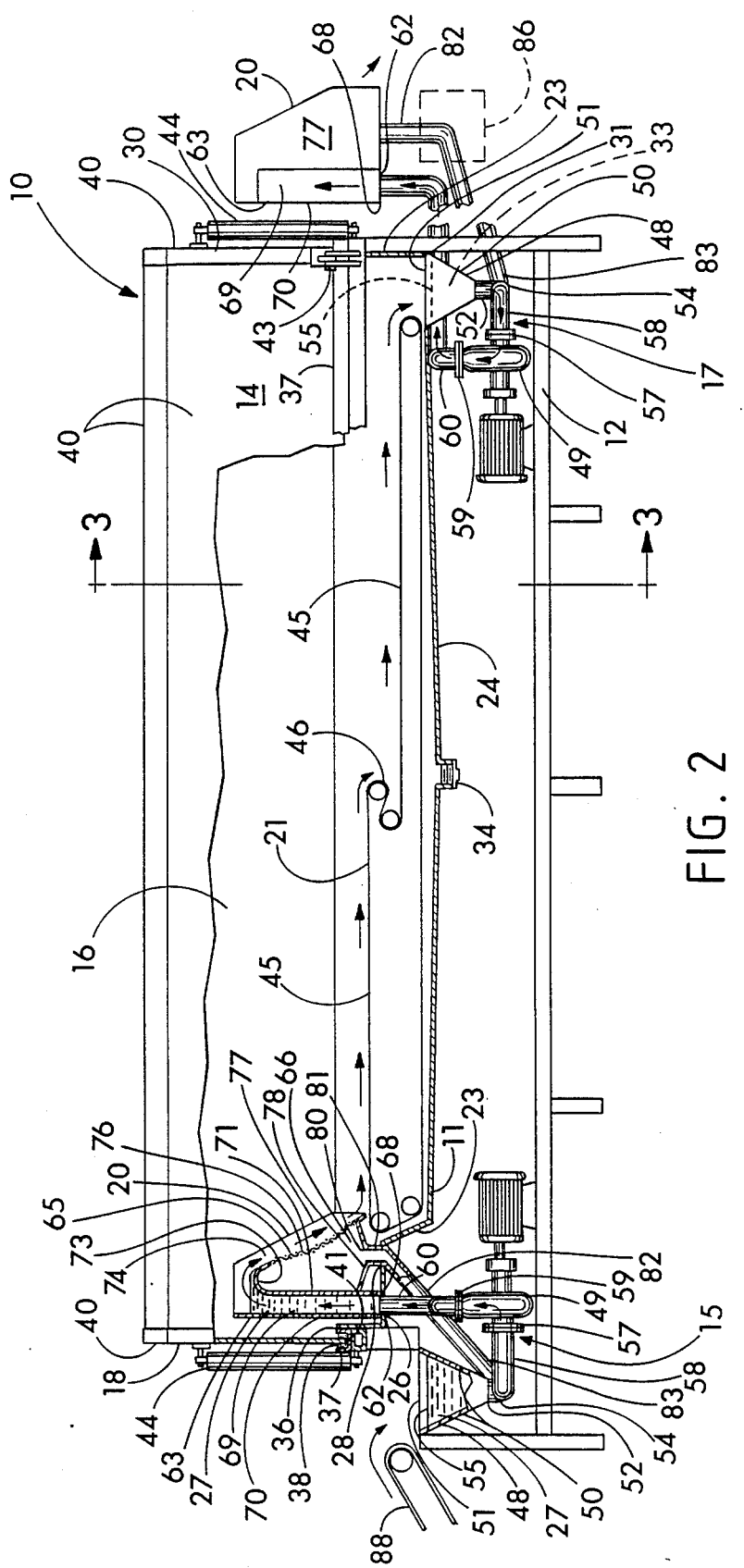
FIG. 2 is a side elevational view of the improved water seal blancher of FIG. 1, with a portion of the cover cut away to show the dewaterer within the steam chamber in vertical cross-sectional view, and with a portion of the base cut away to expose the conveyor apparatus and the base bottom wall.

Referring more particularly to the drawings, wherein like numbers refer to like parts, FIG. 1 shows a preferred improved water seal blancher 10 which utilizes a steam proof chamber to subject particulate vegetables to a controlled temperature treatment in steam. The blancher 10 has an elongated open top base 11 supported by a frame 12, an elongated vaulted cover 14 which is adapted to fit over the base 11 to form the steam proof chamber 16, and two hydro food pump and dewatering systems 15 and 17 for moving the particulate vegetables both into and out of the chamber 16 without undermining the integrity of the steam sealed condition of the chamber 16. FIG. 1 shows the feed end 18 and right side of the blancher 10, with portions of the base 11 and cover 14 cut away to show the dewaterer 20 and conveyor apparatus 21 within the chamber 16. FIG. 2 shows the side of the blancher 10 with portions of the base 11 and cover 14 cut away to show the conveyor apparatus 21, and both hydro food pump and dewatering systems 15 and 17.

Figure 3:
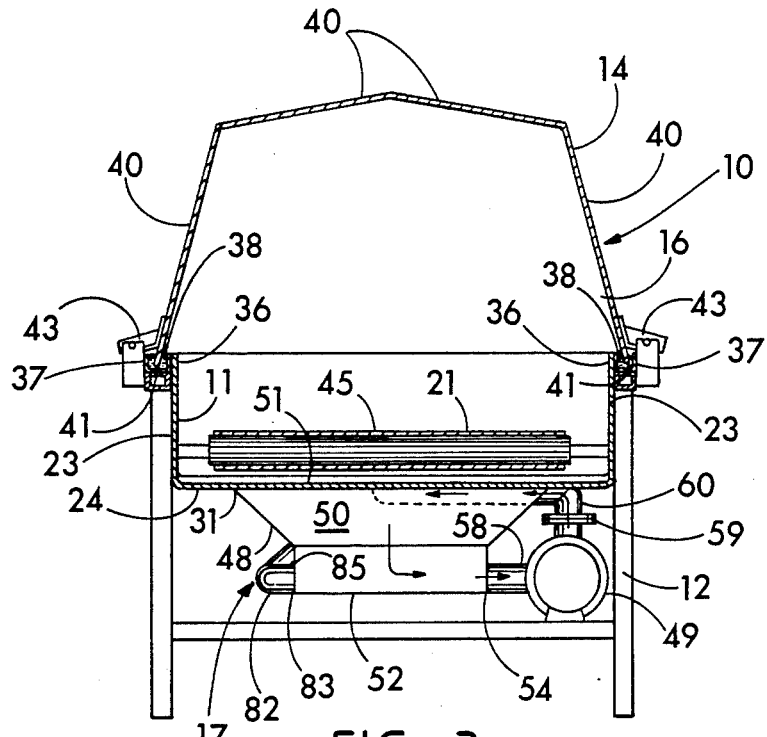
FIG. 3 is a cross-sectional view of the blancher taken along section line 3—3 of FIG. 2.

As shown in FIGS. 2 and 3, the blancher 10 has a base 11 formed of base walls 23 and bottom wall 24 which preferably are fabricated from sheet metal, normally stainless steel. Near the feed end 18 of the blancher 10, a portion of the base bottom wall 24 forms a feed orifice 26 through which food product enters the blancher 10 while entrained within first entraining water 27, and a return orifice 28 through which the first entraining water 27 returns to an exterior of the blancher 10 after being separated from the food product within the blancher 10, as shown in FIG. 2. Near the discharge end 30 of the blancher 10, the base bottom wall 24 has a discharge orifice 31 through which the food product exits from the chamber 16 and becomes entrained within second entraining water 33 in the discharge end recirculation pump and dewatering system 17. The base 11 which is shown in FIGS. 1–4 is fairly shallow. Alternatively, the base 11 may be more tank-like. The base bottom wall 24 inclines downwardly to its center, where a cleanout drain 34 is preferably located. The base sidewalls 23 form an upper periphery 36, where a continuous, substantially horizontal trough 37 is formed which should be at least partially full of sealing water 38 as shown in FIGS. 1, 2 and 3.

The elongated vaulted cover 14 closes over the base 11 to form a body forming the sealed steam-tight chamber 16. The cover 14 includes closed cover walls 40 which are formed from sheet metal, preferably stainless steel. These closed cover walls 40 have a substantially horizontal lower margin 41 which is shaped to fit within the trough 37 and to rest against a bottom of the trough 37 when the cover 14 is closed over the base 11. The entire horizontal lower margin 41 of the closed cover walls 40 is therefore immersed within the sealing water 38 to form a trough "water seal".

As used herein, the term "water seal" is used to describe a condition whereby water is utilized to fill in the interstices or openings between the surfaces of structures, through which steam might otherwise escape.

The depth of the water in a water seal should be enough to overcome the differential in pressure between the atmosphere within the blancher, and the atmosphere outside the blancher. Otherwise the steam would simply push the water out of the way or bubble through the water to the outside atmosphere.

Preferably, the base 11 and cover 14 include cantilever-type hinges 43 with open hinge sockets such as those disclosed in U.S. Pat. No. 4,688,476 to Zittel, the disclosure of which is herein incorporated by reference. As shown, the blancher 10 may be opened from either side using the pressure cylinders 44 located on the side being opened. Alternatively, the blancher 10 may be designed with structures that vary considerably from the base 11 and cover 14, but which form a container with a steam tight chamber and some form of sealable access thereinto from the outside.

Steam is fed into the steam proof chamber by means of steam headers which, though not shown in the figures, are well known in the art of food blanchers. Preferably, steam headers will be located both above and below the top surfaces 45 of the conveyor apparatus 21. Also, the conveyor apparatus 21 preferably is stepped as shown at 46.

As is best shown in FIGS. 1 and 2, the particulate vegetable product is conducted from the ambient atmosphere into the steam-proof chamber 16 by the hydro food pump and dewatering system 15. The preferred system 15 includes a hydro food pump system including a tank intake 48, and a liquid pump 49, in combination with a stationary dewaterer 20. The water pump is an apparatus particularly designed for the transfer of liquids, and available pumps are capable of pumping liquid in a sustained, dependable manner without unusual maintenance requirements. In addition, pumps have been designed for handling and conveying food products in entraining liquid without damage. The tank intake 48 at the feed end of the blancher 10 includes upwardly extending walls 50 which are slanted outwardly to present a slightly funneled shape which is about 3 feet wide at the top. The term "upwardly extending walls" when used herein refers broadly to walls which have a vertical component so that they can form sidewalls for a structure containing fluid. The "upwardly extending walls" might in fact be inclined at a greater than 45° angle to the vertical.

The upwardly extending walls 50 of the intake 48 define the upper opening 51 through which the food product is received into the first entraining water 27 in the intake 48. The intake 48 also includes a bottom 52 which is joined to the upwardly extending walls 50 and which defines a bottom opening 54. Preferably the intake 48 includes a level control device which maintains the water level 55 within the intake 48 at a desired level so that a water seal barrier to air and steam passage to or from the chamber 16 is maintained within the intake 48 at an effective level about the bottom opening 54. It is preferred that the water level be maintained high enough to provide a suitable volume of water within the intake 48 for entraining the incoming particulate food product to ensure proper passage through the pump 49 in a known manner. Although the intake 48 as shown in the figures is a tank-like structure, a pipe with a vertical component or other containing structure would be considered to be equivalent to the intake 48.

Figure 4:
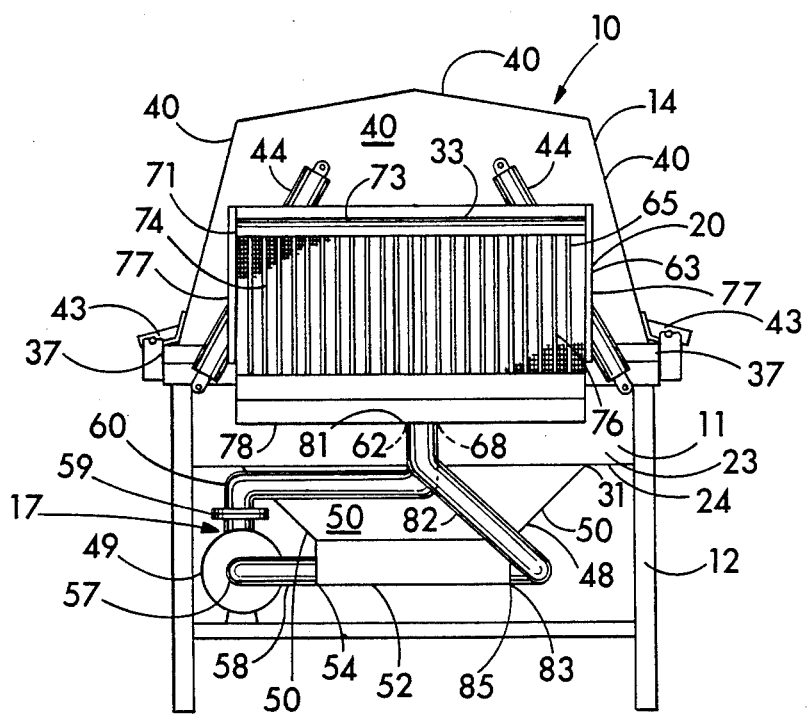
FIG. 4 is an elevational view of the discharge end of the industrial food processing machine of FIG. 1, showing the dewaterer in a position adjacent to the discharge end of the blancher.

The fluid pump 49 includes an inlet 57 which is operably connected by the conduit 58 to the bottom opening 54 of the intake 48 to receive the entraining water and food product. The fluid pump 49 also includes an outlet 59 which is operably connected by the conduit 60 to the bottom hole 62 in the riser tank 63 of the dewaterer 20. As shown in FIGS. 1 and 2, the preferred stationary dewaterer 20 includes the riser tank 63, the slanted screen 65 and the drainage chamber 66 below the slanted screen 65. The riser tank 63 includes a bottom 68 which defines the bottom hole 62 which is operably connected to the pump outlet conduit 60 for receiving the water entrained food product into the tank 63, and upwardly extending walls 69, 70 and 71 which are joined together and to the tank bottom 68 to form the tank 63 so that the first entraining water 27 which is pumped therein to fill the tank maintains with the upwardly extending walls 69, 70 and 71 the tank water seal. One of the upwardly extending walls is the discharge wall 71, which has a substantially horizontal upper edge 73 which is lower than the upper edges of the other upwardly extending walls 69 and 70 so that the entraining water and food product spill out of the filled tank 63 over the horizontal upper edge 73. As shown in FIGS. 2 and 4, the top of the discharge wall 71 of the tank 63 is curved outwardly and downwardly to define the substantially horizontal upper edge 73 and to form a spillway 74.

Positioned below the spillway 74 is the stationary screen 65 which is concavely curved outwardly toward the discharge end 30 so as to be slanted downwardly and outwardly. The slanted screen 65 is thus positioned so that water which spills over the substantially horizontal upper edge 73 falls through the screen 65 while the entrained food product, which is caught by the screen 65 and separated from the water, slides down the topside 76 of the screen 65 onto the conveyor apparatus 21. The water which falls through the screen 65 enters the drainage chamber 66 which is formed by the discharge wall 71, the two flank walls 77, the funneled plate 78, and the screen 65. As shown in FIG. 2, the flank walls 77 extend outwardly beyond the screen 65 and the horizontal upper edge 73 to form splash guards bordering the spillway 74.

As is best shown in FIG. 1, the sidewalls 69 of the riser tank 63 are inclined upwardly and outwardly from the tank bottom 68 near the bottom hole 62 to near the elevation of the substantially horizontal upper edge 73 of the discharge wall 71. The substantial inclination of the sidewalls 69 of the riser tank 63 causes the water and particulate vegetable product discharging from the conduit 60 to slow their upward ascent and spread out along the entire width of the riser tank 63 until at the horizontal upper edge 73 the vegetable product is spread throughout substantially the entire width of the steam chamber 16 at that elevation, and the width of the screen 65 and conveyor apparatus 21 below. Thus the entrained particulate food product will be spread fairly evenly over the width of the screen 65 as it falls, and will be deposited along substantially the entire width of the conveyor apparatus 21 in a substantially even manner for good steam contact within the chamber 16.

The separated entraining water 27 which falls through the screen 65 falls to the funneled plate 78 which has an opening 80 to which the first end 81 of a return conduit 82 is operably connected to receive the entraining water 27 as shown in FIGS. 1 and 2. The second end 83 of the conduit 82 is operably connected to the intake 48 at a return opening 85 near the bottom 52 of the intake 48. Thus, the entraining water in the conduit 82 and the intake 48 maintains the water seal barrier between the interior of the chamber 16 and the external atmosphere.

The hydro food pump and dewatering system 17 at the discharge end 30 of the blancher 10 as shown in FIGS. 2-4 is substantially identical to the system 15 at the feed end 18, except for the minor differences discussed below, and the fact that the discharge end system 17 is removing product from the steam chamber 16 instead of introducing it. Although differences do exist between the two systems 15 and 17, substantially similar parts of both systems 15 and 17 are labeled with identical numbers in FIGS. 1-4.

The following differences in the preferred discharge end system 17 are shown in FIGS. 2-4. The discharge tank intake 48 has to be wide enough to be able to receive the food product dropping from the conveyor apparatus 21, so that it may preferably be about 5 feet wide. The discharge intake 48 is preferably positioned within the discharge orifice 31 of the base bottom wall 24 so that food which drops into the discharge intake 48 also passes through the discharge orifice 31. As the breaks in the conduits 60 and 82 at the discharge end 30 indicate, the stationary dewaterer 20 may be located remotely from the blancher 10. (Likewise, the intake 48 and pump 49 at the feed end of the blancher 10 may be located remotely from the blancher to facilitate material handling of the particulate food product.) Shown in dashed lines at 86 in FIG. 2 is a chiller through which the return conduit 81 may pass to chill the separated second entraining water 33 so that the second entraining water 33 cools the vegetables as they are discharged from the blancher 10 after being heated therein. The dewaterer 20 at the discharge end 30 of the blancher 10 need not have the same width as the dewaterer 20 at the feed end 18, since any structure that the dewaterer 20 may be depositing the particulate vegetable product onto might not be as wide as the 5 foot wide conveyor apparatus 21 within the chamber 16. For example, if the dewaterer 20 at the discharge end 30 were depositing the food product onto a 3 foot wide conveyor, it would be preferable that the width of the dewaterer 20 be no more than 3 feet.

The operation of the preferred improved water seal blancher 10 may be described as follows. Once the chamber 16 is filled with steam coming into the steam headers and comes up to the desired blanching or cooking temperature, the conveyor apparatus 21 and hydro food pump and dewatering systems 15 and 17 may be switched on. The particulate food product is dropped into the intake 48 at the feed end 18 by some means such as the conveyor 88 shown in FIG. 2. The particulate food product drops into the first entraining water 27 which is maintained at a fairly constant water level 55 by a level control. The fluid pump 49 draws the water 27 and entrained food product through the bottom opening 54, the conduit 58, the pump 49 to the conduit 60 and the riser tank 63. As the water 27 and entrained food product is pumped through the riser tank 63, the water 27 and food product slow down and spread out widthwise to the full width of the substantially horizontal upper edge 73 of the discharge wall 71, where the water 27 and entrained vegetables spill over into the spillway 74. The steam within the chamber 16 is unable to pass through the riser tank 63 to the exterior of the blancher 10 because the water 27 within the riser tank 63 forms with the walls 69, 70 and 71 a tank water seal. The water 27 and entrained food product spill out over the horizontal upper edge 73 and drop to the slanted screen 65, where the water 27 passes therethrough and the particulate vegetables slide down the topside 76 to the conveyor apparatus 21. The separated entraining water is then returned to the intake 48 through the drainage chamber 66 and return conduit 82. Since the return conduit 82 is connected to the intake 48 below the water level 55, steam is prevented from escaping from the chamber 16 to the exterior of the blancher 10 by the intake water seal.

Particulate food product which is dropped from the screen 65 onto the feed end of the conveyor apparatus 21 is transported by the apparatus 21 toward the discharge end 30. Midway through the steam chamber 16, the particulate food product is dropped onto the lower of the two top surfaces 45 of the conveyor apparatus 21 at 46 so that the positions of the individual particles are changed to allow for a more even exposure to the steam. When they have completed their timed pass to the discharge end of the conveyor 21, the particles are dropped into the water 33 within the intake 48 at the chamber discharge end 30.

The water level 55, which is shown with a dashed line in the discharge end intake 48, preferably is maintained by a level control device. Steam is not allowed to escape from the chamber 16 through the intake 48 to the exterior of the blancher 10, since the second entraining water 33 forms with the intake walls 50 an intake water seal. The water 33 and entrained food product are drawn by the pump 49 through the intake bottom opening 54, and the conduit 58 to the pump 49 where they are pumped through the conduit 60 to the external riser tank 63. The water 33 and entrained food product within the riser tank 63 move upwardly, spreading out to the entire width of the dewaterer 20. The entraining water 33 and entrained food product then spill over the substantially horizontal upper edge 73 of the discharge wall 71 into the spillway 74. The entraining water 33 drops through the screen 65 into the drainage chamber 66 where it is collected into the return conduit 82. Meanwhile, the food product is caught by the slanted screen 65, thereby separating from the entraining water 33. The particulate food product then slides down the top side 76 of the screen 65 to exit the dewaterer 20 for further processing.

As indicated above, the discharge dewaterer 20 may be located remotely from the blancher 10. For example, the dewaterer 20 might be located adjacent to the next piece of equipment which is used for processing the food product. This would eliminate the need for a conveyor apparatus to convey the particulate food product from the dewaterer 20 to the next piece of processing equipment. If a chiller 86 is used with the discharge end hydro food pump and dewatering system 17, the return conduit 82 and separated entraining water 33 contained therein would pass through the chiller 86 before returning to the intake 48 through the return opening 85.

Changes may be made to the blancher 10 without departing from the principals of this invention. For example, the discharge end hydro food pump and the dewatering system 17 could be replaced by another system which would both remove the food product from the chamber 16 and dewater the food product, while maintaining a water seal through which the product is moved. Such an alternative system might include a U-shaped trap in the conduit through which the water 33 and entrained food product is removed from the chamber 16. Another alternative might include an intake similar to the intake 48 shown, and a discharge pipe with a controllable valve which allows the entraining water 33 and entrained food product to be withdrawn by gravity from the intake through the discharge pipe at a controlled flow rate so that the water level within the intake is maintained at a specific level to thereby maintain a water seal between the chamber 16 and the blancher exterior. In such an alternative system, water could be conveyed into the intake to replace the water which is being withdrawn by gravity. The fluid dynamics of the discharge pipe preferably would be regulated to maintain the water seal. Additionally, a different type of dewaterer might be used in place of that shown at the discharge end 30. For example, a dewatering vibrator-dewaterer, or a water reclaim reel, both of which are well known in the art, could be used to replace the dewaterer 20 shown at the discharge end 30. At the feed end 18 of the blancher 10, the second end 83 of the return conduit 82 might discharge returning entraining water 27 above the water level 55, if the conduit 81 were controllably valved to maintain a water seal therein, or were to include a U-shaped trap which would also maintain a water seal therein.

Figure 5:
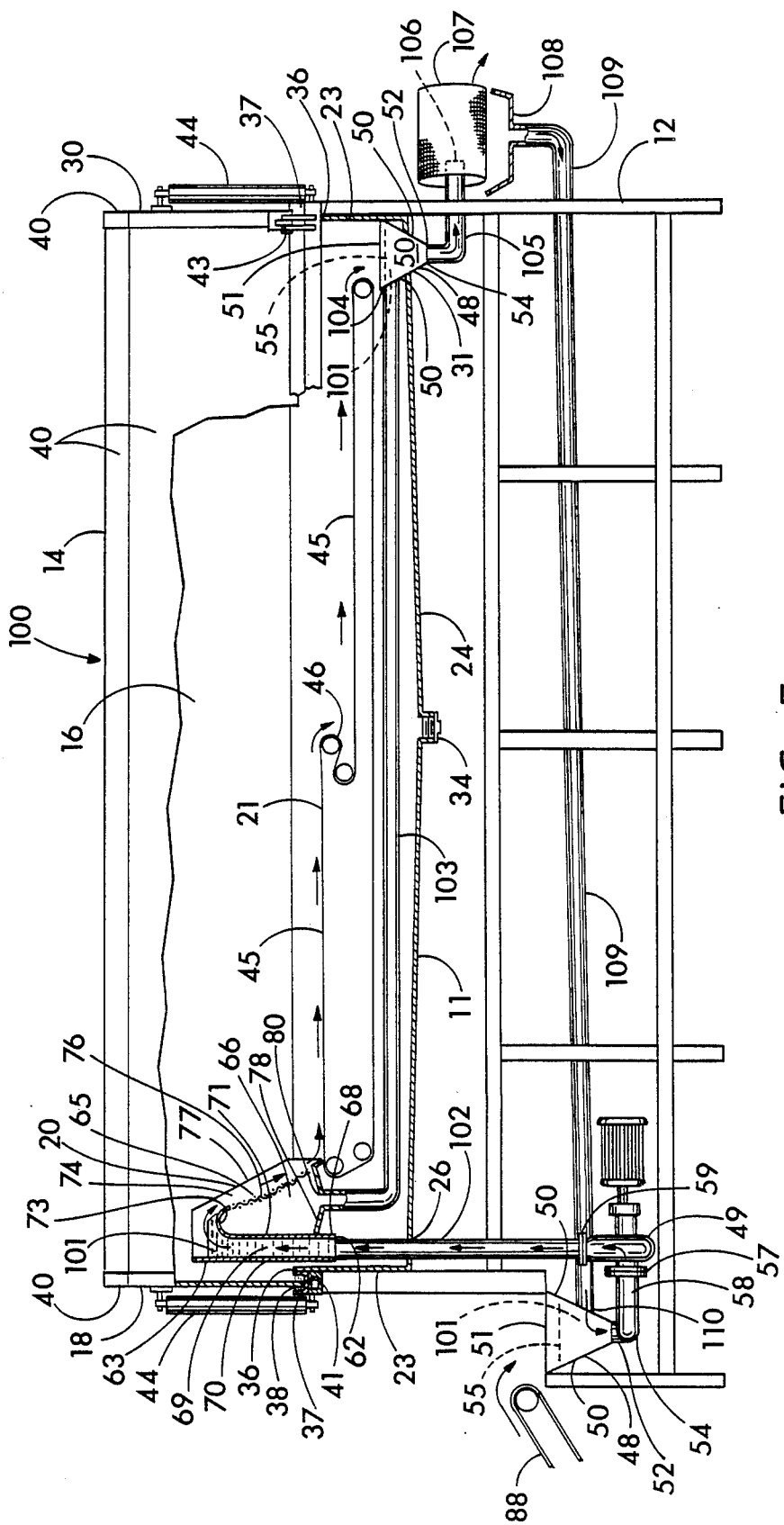
FIG. 5 is a side elevational view of an alternative improved water seal blancher, with a portion of the cover cut away to show the dewaterer within the steam chamber in vertical cross-sectional view, and with a portion of the base cut away to expose the conveyor apparatus and the base bottom wall.

One alternative improved water seal blancher 100 is shown in FIG. 5. Parts which are substantially similar to those in FIGS. 1-4 are shown with the identical numbers. The alternative blancher 100 shown in FIG. 5 requires only a single pump 49 to introduce the food product into the elevated steam chamber 16 and to remove it therefrom. A second pump is unnecessary due to the chamber elevation and the movement of entraining water 101 between the feed end 18 and discharge end 30.

As shown in FIG. 5, the conduit 102 connects the pump 49 outlet 59 to the bottom hole 62 of the riser tank 63 at the feed end 18. The conduit 102 is fairly lengthy due to the relatively large difference in elevations of the feed intake 48 and the riser tank 63. Connected to the funneled plate opening 80 is a transfer conduit 103 which conducts the separated entraining water 101 to the intake 48 at the discharge end 30. Since the transfer conduit 103 moves water between points within the steam chamber 16, the discharge end 104 of the transfer conduit might enter the discharge tank intake 48 above or below the water level 55.

A discharge pipe 105 is connected to the bottom opening 54 of the discharge intake 48 to withdraw the water 101 and entrained food product from the steam chamber 16. Preferably the discharge intake 48 has a level control which regulates the water level 55 in the intake 48 to maintain the intake water seal so that steam will not escape through the discharge pipe 105. Additionally, the fluid dynamics of the transfer conduit 103 and discharge pipe might be regulated to control the water level 55 within the discharge intake 48. The other end 106 of the discharge pipe 105 is positioned to deposit the water and entrained food product within a dewaterer such as the barrel-type water reclaim reel 107 shown.

The rotating reel 107 is formed of screen material so that the water 101 which is separated from the food product falls into the collector 108 which is connected to empty into the return conduit 109. The return conduit 109 at its other end 110 is connected to empty into the intake at the feed end 18 of the blancher 100. Again, since the return conduit 109 moves between points outside the steam chamber 16, the end 110 may be above or below the water level 55 of the feed intake 48.

In its operation, the alternative blancher utilizes a single pump 49 and gravity to move the food product and water 101. The pump 49 withdraws the water 101 and entrained food product from the feed intake 48 and pumps them into the dewaterer 20 within the chamber 16 where they are separated. The food product slides onto the conveyor apparatus 21 and the water 101 falls into the transfer conduit which uses gravitational force to move the water 101 into the discharge end intake 48. The steamed food product drops from the conveyor 21 into the water 101 within the discharge intake 48. The water 101 and entrained food product then move gravitationally to the reclaim reel 107 outside the chamber 16 where they are separated. The food product falls out of the right end of the reel 107 and the water 101 returns by gravity through the return conduit 109 to the intake 48 at the feed end 18 of the blancher 100.

It is to be understood that the present invention is not limited to the particular arrangements and embodiments of parts disclosed and illustrated herein, but embraces all such modified forms thereof as come within the following claims.

What is claimed is:

1. An improved water seal blancher, comprising:
   (a) a substantially steam-tight chamber body having an interior, a conveyor apparatus within the chamber body interior for conveying a particulate food product while subjecting the food product to a continuous, controlled steam heat treatment;
   (b) a hydro food pump including an intake having an upper opening exposed to the external atmosphere through which the food product may be received and a bottom opening, and having walls of sufficient height for entraining water within the intake to form an intake water seal between the upper opening and the bottom opening; and a liquid pump having an inlet connected in fluid communication to the intake bottom opening and an outlet conduit extending into the chamber body in fluid-tight relation;
   (c) a riser tank within the chamber including a bottom defining a bottom hole connected to the pump outlet conduit in fluid communication, and upwardly extending walls, one said wall having a substantially horizontal upper edge of substantial width so that water and entrained food product pumped through the pump outlet conduit into the riser tank will rise and spill over the horizontal upper edge along the width thereof and out of the riser tank;
   (d) a separator screen about as wide as the riser tank horizontal upper edge positioned below the upper edge to receive spilled water and food product therefrom so that food product will be caught on the screen and entraining water will fall through the screen, the screen including a topside which is slanted downwardly away from the riser tank horizontal upper edge and toward the conveyor apparatus so that food product which is caught by the screen will move down and off the screen topside onto the conveyor apparatus; and
   (e) a return conduit extending out of the container body in fluid-tight relation and to the intake below the effective level of the intake water seal to conduct separated entraining water from the chamber to the intake so that entraining water in the intake, pump and conduits will maintain an effective water seal between the interior of the chamber body and the external atmosphere.

2. The blancher specified in claim 1 wherein the return conduit includes a first end which defines a first opening positioned below the separator screen to receive the separated water into the conduit, and a second end which defines a second opening which is operably connected to the intake between the intake upper opening and the pump inlet such that entraining water within the intake and inlet which has a sufficient depth to entirely submerge the second opening and which forms said intake water seal, prevents steam from exiting the chamber through the return conduit.

3. The blancher specified in claim 1 wherein at least one of said riser tank upwardly extending walls is a side wall which is inclined upwardly and outwardly so that the tank is relatively wider at the top than at the bottom and the horizontal upper edge extends substantially the entire width of the tank and is substantially as wide as the conveyor.

4. An improved water seal blancher, comprising:
(a) a substantially steam-tight chamber body having an interior, and a conveyor apparatus within the chamber body interior for conveying a particulate food product while subjecting the food product to a continuous, controlled steam heat treatment;
(b) a hydro food pump including an intake having an upper opening exposed to the chamber body interior and positioned below the conveyor apparatus to receive particulate food product discharging from the conveyor apparatus into entraining water within the intake, and a bottom opening, the intake having walls extending through the chamber body in fluid tight relation and being of sufficient height for entraining water within the intake to form a water seal between the upper opening and the bottom opening, and a liquid pump having an inlet connected in fluid communication to the intake bottom opening and an outlet conduit;
(c) a riser tank outside the chamber body including a bottom defining a bottom hole connected to the pump outlet conduit in fluid communication, and upwardly extending walls, one said wall having a substantially horizontal upper edge so that water and entrained food product pumped through the pump outlet conduit into the riser tank will rise and spill over the horizontal upper edge along the width thereof and out of the riser tank;
(d) a separator screen positioned below the riser tank horizontal upper edge to receive spilled water and food product therefrom so that food product will be caught on the screen and entrained water will fall through the screen, the screen including a top side which is slanted downwardly away from the riser tank horizontal upper edge so that food product which is caught by the screen will be discharged down and off the screen; and
(e) a return conduit extending from below the separator screen to the intake below the effective level of the intake water seal to conduct separated entraining water from beneath the separating screen to the intake so that entraining water in the intake, pump and conduits will maintain an effective water seal between the interior of the chamber body and the external atmosphere.

5. The blancher specified in claim 4 wherein said return conduit includes a chiller for cooling the separated entraining water.

6. The blancher specified in claim 4 wherein at least one of said riser tank upwardly extending walls is a side wall which is inclined upwardly and outwardly so that the tank is relatively wider at the top than at the bottom and the horizontal upper edge extends substantially the entire width of the tank.

7. An improved water seal blancher, comprising:
(a) a substantially steam-tight chamber body having an interior, and a conveyor apparatus within the chamber body interior for conveying a particulate food product while subjecting the food product to a continuous, controlled steam heat treatment;
(b) a first hydro food pump including a first tank intake having an upper opening exposed to the external atmosphere through which a food product may be received and a bottom opening, and having walls of sufficient height for entraining water within the intake to form an intake water seal between the upper opening and the bottom opening; and a first liquid pump having an inlet connected in fluid communication to the intake bottom opening and a first outlet conduit extending into the chamber body in fluid-tight relation;
(c) a first riser tank within the chamber including a bottom defining a bottom hole connected to the first pump outlet conduit in fluid communication and upwardly extending walls, one said wall having a substantially horizontal upper edge of substantial width so that water and entrained food product pumped through the pump outlet conduit into the riser tank will rise and spill over the horizontal upper edge along the width thereof and out of the riser tank;
(d) a first separator screen about as wide as the first riser tank horizontal upper edge positioned below said upper edge to receive spilled water and food product therefrom so that food product will be caught on the screen and entraining water will fall through the screen, the first screen including a top side which is slanted downwardly away from the first riser tank horizontal upper edge and toward the conveyor apparatus so that food product which is caught by the screen will move down and off the screen top side onto the conveyor apparatus;
(e) and a first return conduit extending out of the container body in fluid-tight relation and to the first intake below the effective level of the first intake water seal to conduit separating entraining water from the chamber to the intake so that entraining water in the first intake, first pump and first conduits will maintain and effective water seal between the interior of the chamber body and the external atmosphere;
(f) a second hydro food pump including a second tank intake having an upper opening exposed to the chamber interior and positioned below the conveyor apparatus to receive particulate food product which is discharged from the conveyor apparatus into entraining water within the second intake, the second intake including walls extending downwardly through the chamber body in fluid-tight relation and a bottom opening located externally of the chamber body, the walls being of sufficient height for entraining water within the second tank intake to form a water seal between the upper opening and the bottom opening; and a second liquid pump located externally of the chamber body and having an inlet connected in fluid communication to the second intake bottom opening and a first outlet conduit;

(g) a second riser tank located externally of the chamber body and including a bottom defining a bottom hole connected to the pump outlet conduit in fluid communication and upwardly extending walls, one said wall having a substantially horizontal upper edge so that water and entrained food product pumped through the pump outlet conduit into the riser tank will rise and spill over the horizontal upper edge along the width thereof and out of the riser tank into the external atmosphere;

(h) a second separator screen about as wide as the second riser tank horizontal upper edge positioned below the said upper edge to receive spilled water and food product therefrom so that food product will be caught on the second screen and entraining water will fall through said screen, the second screen including a top side which is slanted downwardly away from the second riser tank horizontal upper edge so that food product which is caught by the second screen will discharge down and off the screen; and (i) a second return conduit extending from below the second separator screen to the second intake below the effective level of the intake water seal to conduct separated entraining water from below the second screen to the second intake so that entraining water in the second intake, second pump and second conduits will maintain an effective water seal between the interior of the chamber body and the external atmosphere.

8. The blancher specified in claim 7 wherein at least one of said first raising tank upwardly extending walls is a sidewall which is inclined upwardly and outwardly so that the said tank is relatively wider at the to than at the bottom and the horizontal upper edge extends substantially the entire width of the second rising tank and is substantially as wide as the conveyor.

9. An improved water seal blancher for subjecting a particulate food product to a continuous, controlled temperature treatment in steam, comprising:

(a) an elongated open top base with a feed end and a discharge end, the base including a substantially closed base bottom wall which at the feed end thereof defines a feed orifice through which food product enters the blancher entrained in first entraining water and a return orifice through which separated first entraining water returns to an exterior of the blancher, and which at the discharge end thereof defines a discharge orifice through which the food product exits from the chamber to become entrained in second entraining water, the base further including a substantially horizontal trough around its upper periphery, said trough being at least partially full of sealing water;

(b) an elongated cover which together with the base defines a steam-tight chamber, the chamber containing a conveyor apparatus for supporting and transporting food product within the chamber, the cover including closed cover walls which define a substantially horizontal lower margin which is shaped to fit within the trough when the cover is closed over the base so as to be immersed within the sealing water to form a trough water seal;

(c) means at the feed end for receiving the food product, for entraining the food product in the first entraining water, and for conducting the entrained food product into the blancher through the feed orifice;

(d) a first riser tank including a bottom defining a bottom hole connected to said receiving, entraining and conducting means to receive the water and entrained food product into the tank, and upwardly extending walls joined together and to the bottom such that the first entraining water which fills the riser tank forms with the upwardly extending walls a tank water seal, one of said upwardly extending walls including a substantially horizontal upper edge which is lower than upper edges of the other upwardly extending walls so that the entraining water and food product spill out of said tank;

(e) a slanted stationary separator screen below said horizontal upper edge positioned to receive the entraining water and entrained food product such that the first entraining water falls through the screen, and the food product is separated from the water by the screen to slide down a topside of the slanted screen to the conveying apparatus;

(f) means for conducting separated first entraining water through the return orifice and back to the receiving, entraining and conducting means such that a water seal is maintained between the chamber atmosphere and an external atmosphere;

(g) means at the discharge end for receiving the food product discharged from the conveyor apparatus, for entraining the food product in the second entraining water, and for conducting the food product out from the chamber through the discharge orifice;

(h) a second riser tank including a bottom defining a bottom hole connected to said receiving, entraining and conducting means to receive water and the entrained food product into the tank, and upwardly extending walls joined together and to the bottom such that the second entraining water which fills the riser tank forms with the upwardly extending walls a tank water seal, one of said upwardly extending walls including a substantially horizontal upper edge which is lower than upper edges of the other upwardly extending walls so that the entraining water and food product spill out of the tank over said horizontal upper edge; and (i) a slanted second stationary separator screen below said horizontal upper edge positioned to receive the water and entrained food product spilling thereover such that the second entraining water falls through the screen and the food product is separated from the water to slide down a topside of the slanted screen.

10. The blancher specified in claim 9 wherein at least one of the receiving, entraining and conducting means includes a tank intake having walls which define an upper opening through which the food product can be deposited into entraining water within the intake, and a bottom which defines a bottom opening such that when water within the tank intake has a sufficient depth to cover the bottom opening, the water forms with the intake an effective intake water seal; and a fluid pump including an inlet which is operably connected to the intake bottom opening to receive the entraining water and food product, and an outlet which is operably connected to the riser tank at the bottom hole thereof to deliver the entrained food product to the tank.

11. The blancher specified in claim 9 further including means at the discharge end for conducting separated second entraining water back to the discharge and receiving, entraining and conducting means such that a water seal is maintained between the chamber atmosphere and an external atmosphere.

12. The blancher specified in claim 11 wherein said separated second entraining water conducting means includes a chiller for cooling the separated second entraining water.

13. The blancher specified in claim 11 wherein at least one of the separated entraining water conducting means comprises a conduit defining an opening at one end below the slanted screen to receive the separated entraining water into the conduit, and defining another opening at the other end which is operably connected to the intake such that the opening connected to the intake is entirely immersed below the entraining water within the intake.

14. The blancher specified in claim 9 wherein the upwardly extending walls of the first riser tank include a side wall of which at least a portion is slanted upwardly and outwardly, and a discharge wall which defines said substantially horizontal upper edge to have a width substantially as wide as the chamber.

15. A hydro food pump and dewatering system for conducting a particulate food product between an ambient and a steam atmosphere to another atmosphere through a substantially steam proof blancher wall therebetween, comprising:
   (a) a tank intake including walls defining an upper opening through which the food product in one said atmosphere can be received into entraining water within the intake and having a bottom defining a bottom opening, such that water may at least partially fill the intake to form with the walls an intake water seal capable of separating the two atmospheres;
   (b) a fluid pump including an inlet and an outlet conduit, the inlet being operably connected to the intake bottom opening to receive the entraining water and food product;
   (c) a riser tank including a bottom defining a bottom hole operably connected to the pump outlet conduit for receiving the water entrained food product into the tank, and upwardly extending walls joined together and to the tank bottom, one of said upwardly extending walls including a substantially horizontal upper edge which is lower than upper edges of the other walls so that the entraining water and food product received by the tank will be forced upwardly within the tank until they spill out of the tank over said horizontal upper edge into the other said atmosphere;
   (d) a slanted separator screen below said horizontal upper edge positioned to receive the water and entrained food product such that the water falls through the screen while the food product is caught by the screen and separated from the water so the food product can slide down a topside of the slanted screen; and
   (e) a return conduit extending from beneath the separator screen for conducting the separated water back to the intake below the effective level of the intake water seal so that entraining water in the intake, pump and conduits will maintain an effective water seal between the two said atmospheres.

16. The system specified in claim 15 wherein the return conduit includes a chiller for cooling the separated entraining water.

17. The system specified in claim 15 wherein the upwardly extending walls of the riser tank include a side wall of which at least a portion is slanted upwardly and outwardly; and a discharge wall which adjoins said side wall along a side margin, a portion of the side margin slanting upwardly and outwardly, the discharge wall defining said substantially horizontal upper edge to have a width substantially wider than the tank bottom to distribute the particulate food product across an extended width of the separator screen.

18. A system for conducting a particulate food product between an ambient atmosphere and a stream atmosphere through a substantially steam proof blancher wall therebetween, comprising:
   (a) means for receiving the food product within one of said atmosphere and directing the food product into entraining water, and for conducting the entrained food product through the blancher wall in fluid-tight relation;
   (b) a riser tank including a bottom defining a bottom hole operably connected to said receiving and conducting means to receive the entrained food product into the tank; two sidewalls joined to the tank bottom and each including a portion which is slanted upwardly and outwardly so that the tank is wider at a top thereof than at the bottom; an end wall joined to both sidewalls and the bottom; a discharge wall opposite the end wall, joined to the sidewalls and bottom, the discharge wall including a substantially horizontal upper edge which is lower in elevation than upper edges of the sidewalls and end wall so that entraining water and food product which fill the tank spread out sidewardly as they approach the horizontal upper edge, and then spill out of the riser tank over said horizontal upper edge into the other said atmosphere;
   (c) a screen positioned below said horizontal upper edge to receive the water and entrained food product such that the entraining water falls through the screen and the food product is separated from the water, the screen including a topside which is slanted downwardly away from the horizontal upper edge so that food product which is caught by the screen slides down the screen topside and off the screen; and
   (d) means for conducting the separated entraining water back to the receiving and conducting means such that a water seal is maintained between the two atmospheres.

19. The system specified in claim 18 wherein said separated entraining water conducting means includes a chiller for cooling the separated entraining water.

20. The system specified in claim 18 wherein the receiving and conducting means includes a tank intake including upwardly extending intake walls adjoined to one another, the intake walls defining an upper opening through which the food product is received into the entraining water within the intake, and a bottom which adjoins said intake walls and defines a bottom opening such that entraining water within the intake, which has sufficient depth to entirely submerge the bottom opening, forms with the tank intake an intake water seal between the two atmospheres; and a fluid pump including an inlet which is operably connected to the intake bottom opening to receive the water and entrained food product from the intake and an outlet which is operably connected to the riser tank at the bottom hole thereof to pump the water and entrained food product to the tank.

21. The system specified in claim 18 wherein the separated entraining water conducting means comprises a conduit including a first end which defines a first opening positioned below said screen to receive the separated water into the conduit, and a second end which defines a second opening which is operably connected to the receiving and conducting means between the intake upper opening and the pump outlet.

22. An improved water seal blancher for subjecting a particulate food product to a continuous, controlled heat treatment in steam, comprising:
(a) a container with a feed end and a discharge end which forms a steam-tight chamber therein for containing a conveyor apparatus which conveys the food product through the steam from near the feed end to near the discharge end of the chamber, the container including closed walls which define near the feed end thereof a feed orifice through which the food product enters the blancher entrained in entraining water, and near the discharge end thereof, a discharge orifice through which the food product leaves the chamber entrained within entraining water;
(b) a feed tank intake including upwardly extending intake walls adjoined to one another, the intake walls defining an upper opening through which the food product is received into the entraining water within the intake, and a bottom which joins said intake walls and defines a bottom opening such that entraining water within the intake, which has a sufficient depth to entirely submerge the bottom opening, forms with the intake an intake water seal between the chamber and blancher exterior;
(c) a fluid pump including an inlet and an outlet, the inlet being operably connected to the intake bottom opening to receive the water and entrained food product from the intake;
(d) a riser tank within the chamber including a bottom defining a bottom hole to which the pump outlet is operably connected to pump the water and entrained food product into the tank, and upwardly extending walls joined together and to the tank bottom such that entraining water filling the riser tank forms with the tank walls a tank water seal, one of said upwardly extending walls including a substantially horizontal upper edge which is lower in elevation than upper edges of the other upwardly extending walls and which is substantially as wide as the conveyor apparatus so that the water and entrained food product will spill over said horizontal upper edge out of the tank along the width of the edge;
(e) a screen which is substantially as wide as the conveyor apparatus and is positioned below said horizontal upper edge to receive the spilled water and food product such that the entraining water will fall through the screen and the food product will be separated from the water, the screen including a top side which is slanted downwardly away from the horizontal upper edge toward the conveyor apparatus so that food product which is caught by the screen slides down the screen topside off the screen onto the conveyor apparatus;
(f) a discharge tank intake positioned below the discharge end of the conveyor apparatus to receive particulate food product which drops from the conveyor apparatus into entraining water within the intake, the intake including upwardly extending intake walls adjoined to one another, the intake walls defining an upper opening through which the food product is received into the entraining water within the intake, and a bottom which joins said intake walls and defines a bottom opening such that entraining water within the intake, which has a sufficient depth to entirely submerge the bottom opening, forms with the intake an intake water seal between the chamber and blancher exterior;
(g) means for conducting the entraining water separated by the screen to the intake positioned below the discharge end of the conveyor apparatus;
(h) means for conducting the water and entrained food product within the discharge tank intake to a dewaterer outside of the blancher, the dewaterer separating the food product from the entraining water; and
(i) means for conducting the entraining water separated by the dewaterer outside the blancher back to the feed tank intake.

23. A hydro feed pump and dewatering system for conducting a particulate food product from a first atmosphere to a second atmosphere through a substantially steam proof blancher wall therebetween, and later conducting the steamed food product through the blancher wall to the first atmosphere, comprising:
(a) a feed tank intake including upwardly extending walls defining an upper opening through which the food product can be received from the first atmosphere into entraining water within the intake and a bottom defining a bottom opening, such that water within the intake, which at least partially fills the intake, forms with the upwardly extending walls an intake water seal between the first and second atmospheres;
(b) a fluid pump including an inlet and an outlet, the inlet being operably connected to the intake bottom opening to receive the entraining water and food product;
(c) a riser tank in the second atmosphere including a bottom defining a bottom hole operably connected to the pump outlet for receiving the water entrained food product into the tank, and upwardly extending walls joined together and to the tank bottom such that the entraining water which fills the riser tank forms with the upwardly extending walls a tank water seal, one of said upwardly extending walls including a substantially horizontal upper edge which is lower than upper edges of the other upwardly extending walls so that the entraining water and food product spill out of the tank over said horizontal upper edge;
(d) a slanted screen below said horizontal upper edge positioned to receive the water and entrained food product such that the water falls through the screen while the food product is caught by the screen and separated from the water so that the food product can slide down a top side of the slanted screen;
(e) a discharge tank intake positioned to receive from the second atmosphere particulate food product into entraining water within the intake, the intake including upwardly extending intake walls adjoined to one another, the intake walls defining an upper opening through which the food product is received into the entraining water within the intake, and a bottom which joins said intake walls and defines a bottom opening such that entraining water within the intake, which has a sufficient depth to entirely submerge the bottom opening, forms with the intake an intake water seal between the second and first atmospheres;

(f) means for receiving the food product sliding down the slanted screen and for conducting the food product through the second atmosphere to the entraining water within the discharge tank intake;

(g) means for conducting the entraining water which is separated by the screen into the discharge tank intake;

(h) means for conducting the water and entrained food product within the discharge tank intake to a dewaterer within the first atmosphere, the dewaterer separating the food product from the entraining water; and (i) means for returning the separated entraining water from the dewaterer to the feed tank intake.

* * * * *